United States Patent
Katayama et al.

(10) Patent No.: US 8,478,601 B2
(45) Date of Patent: Jul. 2, 2013

(54) VOICE RECOGNITION APPARATUS, METHOD FOR RECOGNIZING VOICE, AND NAVIGATION APPARATUS HAVING THE SAME

(75) Inventors: Yuusuke Katayama, Nishikamo-gun (JP); Katsushi Asami, Nukata-gun (JP); Manabu Otsuka, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 822 days.

(21) Appl. No.: 12/656,541

(22) Filed: Feb. 2, 2010

(65) Prior Publication Data

US 2010/0198093 A1 Aug. 5, 2010

(30) Foreign Application Priority Data

Feb. 3, 2009 (JP) .................................. 2009-22742

(51) Int. Cl.
*G10L 15/00* (2006.01)
(52) U.S. Cl.
USPC ............................ 704/275; 704/270; 701/468
(58) Field of Classification Search
USPC .................................. 704/270, 275; 701/468
See application file for complete search history.

(56) References Cited

U.S. PATENT DOCUMENTS

| | | | | |
|---|---|---|---|---|
| 6,606,599 | B2 * | 8/2003 | Grant et al. | 704/275 |
| 8,165,886 | B1 * | 4/2012 | Gagnon et al. | 704/275 |
| 2007/0050191 | A1 * | 3/2007 | Weider et al. | 704/275 |
| 2010/0023320 | A1 * | 1/2010 | Di Cristo et al. | 704/9 |

FOREIGN PATENT DOCUMENTS

| | | |
|---|---|---|
| JP | A-2001-034291 | 2/2001 |
| JP | A-2001-075595 | 3/2001 |
| JP | A-2004-125572 | 4/2004 |
| JP | A-2008-014818 | 1/2008 |

\* cited by examiner

*Primary Examiner* — Daniel D Abebe
(74) *Attorney, Agent, or Firm* — Posz Law Group, PLC

(57) ABSTRACT

A voice recognition apparatus includes: a voice input element for inputting voice of an user; a voice pattern memory for storing multiple voice patterns respectively corresponding to multiple phrases; a voice recognition element for calculating a similarity degree between the voice and each voice pattern and determining the highest similarity degree so that one voice pattern corresponding to the highest similarity degree is recognized as the voice; a display for displaying a recognition result corresponding to the one voice pattern; an execution determination element for executing a process according to the one voice pattern when a predetermined operation is input by the user; a load estimation element for estimating a load of the user; and a display controller for controlling the display based on a positive correlation between the load and display repetition of the recognition result on the display.

18 Claims, 9 Drawing Sheets

VOICE RECOGNITION APPARATUS, METHOD FOR RECOGNIZING VOICE, AND NAVIGATION APPARATUS HAVING THE SAME

CROSS REFERENCE TO RELATED APPLICATION

This application is based on Japanese Patent Application No. 2009-22742 filed on Feb. 3, 2009, the disclosure of which is incorporated herein by reference.

FIELD OF THE INVENTION

The present invention relates to a voice recognition apparatus, a method for recognizing voice, and navigation apparatus having a voice recognition apparatus.

BACKGROUND OF THE INVENTION

Conventionally, a voice recognition apparatus for recognizing vocabulary, words or phrase intentionally output from a user when voice is input from the user into the apparatus, is well known. Various systems having a user interface with using the voice recognition apparatus are capable of being operated by the user in a handsfree manner. Thus, the systems are easily utilized by a person.

The voice recognition apparatus compares time series feature obtained from a voice signal input into the apparatus and a reference voice pattern corresponding to a respective word or phrase, which is preliminary registered. Then, the apparatus calculates a degree of similarity for representing a degree of relatedness between the reference voice pattern and the feature. The apparatus recognizes voice sounded by the user when the voice corresponds to the reference voice pattern having the highest degree of similarity.

Here, the voice recognition apparatus is well known such that the apparatus starts to execute a process for recognizing voice when the user operates a utterance start button for informing the apparatus of the start of utterance. It is necessary for the user to operate the button of the apparatus at every time when the user utilizes the apparatus. Thus, it is bothersome for the user to utilize the apparatus. When a navigation apparatus having the voice recognition apparatus is mounted on a vehicle, a driver as the user has to sound words or phrase showing a destination again, for example, or execute operation corresponding to the sounding the words or the phrase when the user sets the destination based on conversation of the user. Accordingly, the user may conceive that the apparatus is bothersome.

To resolve the above difficulty, the voice sounded by the user is always input into the apparatus, and the apparatus executes the voice recognition. Then, the apparatus displays recognition results, and the user executes determination operation. Thus, the apparatus executes a process based on the recognition results. This apparatus is disclosed in JP-A-2008-14818.

Since the above apparatus always executes the voice recognition, the apparatus displays the recognition results corresponding to words or phrase, which are not necessary to recognize with the apparatus. Thus, the user may be bothered and unpleasant. Accordingly, it is preferable to have a reject function in the apparatus. The reject function provides to determine whether the recognition results are correct before displaying the recognition results and not to display the recognition results and to delete the recognition results when the recognition results are not correct.

The above determination with respect to correct or incorrect recognition results may be performed such that the apparatus determines whether the degree of similarity is equal to or larger than a predetermined threshold as a correct-incorrect determination value. Specifically, when the degree of similarity is equal to or larger than the threshold, the apparatus determines that the recognition results are correct. When the degree of similarity is smaller than the threshold, the apparatus determines that the recognition results are not correct.

Here, the threshold may not be constant. Alternatively, the threshold may be changed according to environmental conditions so that usability of the apparatus is improved. For example, when the apparatus executes the voice recognition under a condition that there is a noise around the apparatus, and the apparatus determines whether the recognition results are correct, the apparatus adjusts the threshold according to magnitude of the noise in the environment so that a ratio of determination that the recognition results are correct is controlled to be constant without depending on the magnitude of the noise. This apparatus is disclosed in JP-A-2001-34291. Specifically, for example, as shown in FIG. 9, even when the same voice is input into the apparatus, the bigger the noise, the smaller the similarity degree. This is shown as multiple points SP. Thus, the threshold is changed such that the threshold is small when the noise is large. This is shown as a line ST.

In the above apparatus, the ratio of display of the recognition results is controlled to be constant without depending on the magnitude of the noise around the apparatus. However, even when the magnitude of the noise is same, and the display ration is same, the unpleasant degree of the user may be changed according to a condition of the user.

For example, when the voice recognition apparatus is mounted on the vehicle, and the vehicle stops temporarily, it is not necessary for the driver to pay attention to the driving of the vehicle, and thereby, the driver may easily find the display of the recognition results. Accordingly, the driver may very frequently find the display of the recognition results corresponding to the utterance, which is not necessary to be recognized. Thus, the display bothers the driver. Further, when the vehicle runs in an urban area on a rainy day, it is necessary for the driver to concentrate the driving of the vehicle. Therefore, the driver may not find the display of the recognition results. Thus, the driver may not find the display of the recognition results corresponding to the utterance, which is not necessary to be recognized. Thus, sense of unpleasantness of the driver is small.

Accordingly, in the apparatus disclosed in JP-A-2001-34291, the sense of unpleasantness of the driver is not always reduced when the recognition results corresponding to the utterance, which is not necessary to be recognized, is displayed.

It is considered that the threshold is set to be large so as to reduce the frequency of the display of the recognition results corresponding to the utterance, which is not necessary to be recognized. However, in this case, the recognition results are not displayed easily. Thus, the usability of the voice recognition apparatus is reduced.

SUMMARY OF THE INVENTION

In view of the above-described problem, it is an object of the present disclosure to provide a voice recognition apparatus. It is another object of the present disclosure to provide a method for recognizing voice. It is further another object of the present disclosure to provide a navigation apparatus for recognizing voice. In the above apparatus and method, without reducing usability, sense of unpleasantness of a user is improved. The unpleasantness is caused by display of a recognition result corresponding to utterance, which is not necessary to be recognized.

According to a first aspect of the present disclosure, a voice recognition apparatus includes: a voice input element for inputting voice of an user; a voice pattern memory for storing a plurality of voice patterns respectively corresponding to a plurality of phrases, which are preliminary set; a voice recognition element for calculating a similarity degree between the voice and each of the voice patterns and determining the highest similarity degree so that one of the voice patterns corresponding to the highest similarity degree is recognized as the voice of the user; a display for displaying a recognition result corresponding to the one of the voice patterns; an execution determination element for executing a process according to the one of the voice patterns when a predetermined operation is input by the user after the display displays the recognition result; a load estimation element for estimating a load of the user; and a display controller for controlling the display based on a positive correlation between the estimated load and display repetition of the recognition result on the display.

In the above apparatus, without reducing the usability of the apparatus for the user, the unpleasant sense of the user is reduced. The unpleasant of the user is derived from the display of the recognition result corresponding to the phrase, which is not necessary for the apparatus to be recognized.

According to a second aspect of the present disclosure, a method for recognizing a voice includes: inputting the voice of an user; calculating a similarity degree between the voice and each of a plurality of voice patterns, wherein the plurality of voice patterns respectively correspond to a plurality of phrases, which are preliminary set; determining the highest similarity degree so that one of the voice patterns corresponding to the highest similarity degree is recognized as the voice of the user; displaying a recognition result corresponding to the one of the voice patterns; executing a process according to the one of the voice patterns when a predetermined operation is input by the user after the displaying the recognition result; estimating a load of the user; and controlling to display the recognition result based on a positive correlation between the estimated load and display repetition of the recognition result.

In the above method, without reducing the usability for the user, the unpleasant sense of the user is reduced. The unpleasant of the user is derived from the display of the recognition result corresponding to the phrase, which is not necessary for the apparatus to be recognized.

According to a third aspect of the present disclosure, a navigation apparatus includes: the voice recognition apparatus according to the first aspect of the present disclosure.

In the above navigation apparatus, without reducing the usability for the user, the unpleasant sense of the user is reduced. The unpleasant of the user is derived from the display of the recognition result corresponding to the phrase, which is not necessary for the apparatus to be recognized.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
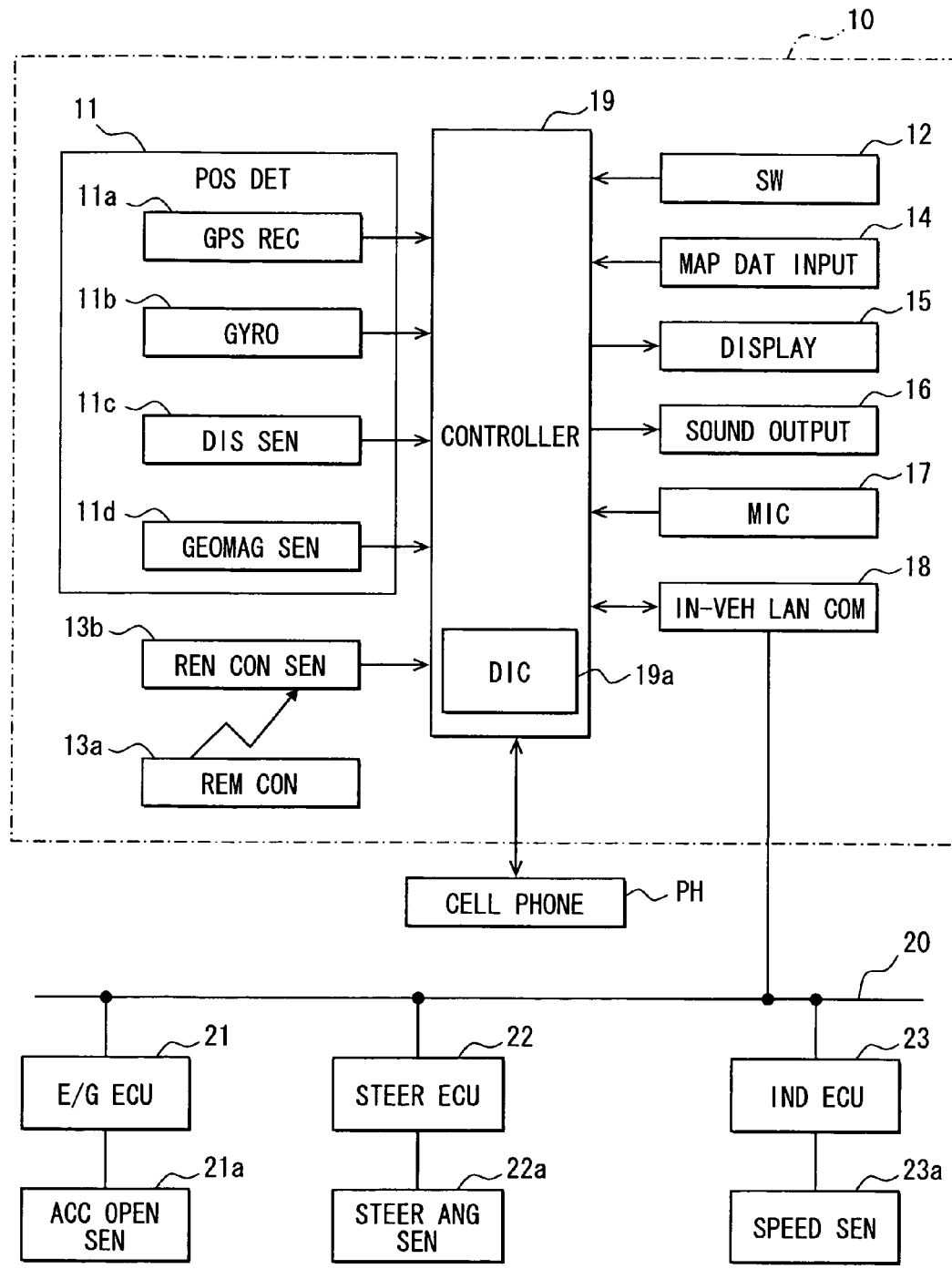
FIG. 1 is a block diagram showing a navigation apparatus according to a first embodiment.

FIG. 1 shows a navigation apparatus 10 and an in-vehicle LAN 20 according to a first embodiment. The apparatus 10 is coupled with the LAN 20.

The navigation apparatus 10 is mounted on a vehicle. As shown in FIG. 1, the apparatus 10 is coupled with various ECUs and in-vehicle equipments via the LAN 20. The ECUs include, for example, an engine ECU 21, a steering ECU 22 and an indicator ECU 23.

The engine ECU 21 controls the number of revolutions of an engine based on a detection signal from an accelerator opening degree sensor 21a, which detects an accelerator opening degree, which corresponds to a pushing amount of an accelerator pedal by the driver. The steering ECU 22 executes power steering control for generating an assisting force when the driver turns the steering wheel so that a steering angle is changed. This control is performed based on a detection signal from a steering angle sensor 22a, which detects the steering angle of a front wheel when the driver operates the steering wheel. The indicator ECU 23 executes control of an indicator (not shown) to display vehicle speed or the like based on a detection signal from a vehicle speed sensor 23a.

The information about the vehicle obtained from the ECUs 21-23 such as the accelerator opening degree, the steering angle and the vehicle speed is transmitted to and received from each other via the LAN 20.

The navigation apparatus 10 includes a position detector 11 for detecting a current position of the vehicle, operation switches 12 for inputting various instructions from the user, a remote controller 13a for inputting various instructions from the user, a remote control sensor 13b for transmitting a signal from the remote controller 13a, a map data input device 14 for inputting map data from a map data storage medium, a display device 15 for displaying the map and various information, a sound output device 16 for outputting a sound such as a guidance message, a microphone 17 for outputting an electric signal based on the voice expressed by the user, an in-vehicle LAN communication device 18 for communicating with other devices via the LAN 20, and a controller 19. Here, the remote controller 13a is separated from the apparatus 10. The map data storage medium stores the map data and various information. The communication device 18 transmits and receives various information about the vehicle from other devices. The controller 19 executes various processes according to an input signal from the position detector 11, the switches 12, the remote control sensor 13b, the map data input device 14, the microphone 17 and the communication device

18. Further, the controller 19 controls the display device 15, the sound output device 16 and the communication device 18.

The position detector 11 includes a GPS receiver 11*a*, a gyroscope 11*b*, a distance sensor 11*c* and a geomagnetic sensor 11*d*. The GPS receiver 11*a* receives an electric wave from a GPS artificial satellite via a GPS antenna (not shown), and outputs a received signal. The gyroscope 11*b* detects magnitude of rotation motion, which is applied to the vehicle. The distance sensor 11*c* detects a distance based on acceleration along with a front-rear direction of the vehicle. The geomagnetic sensor 11*d* detects a driving direction of the vehicle based on geomagnetic field. Based on output signals from the sensors 11*a*-11*d*, the controller 19 calculates the current position and the driving direction of the vehicle.

Here, a method for calculating the current position based on the output signal from the GPS receiver 11*a* may be a point positioning method or a relative positioning method (i.e., a D-GPS method or an interferometric positioning method). Here, the D-GPS method means a differential global positioning system method. Specifically, the method may be a RTK-GPS (real time kinematics global positioning system) method as the interferometric positioning method.

The switches 12 include a touch panel switch integrated with a display element of the display device 15 and a mechanical key switch disposed around the display device 15. A touch panel and the display device 15 are integrally stacked. The touch panel may be a pressure sensitive panel, an electromagnetic resonance panel, an electro static capacitive panel, or various types, which combine the pressure sensitive panel, the electromagnetic resonance panel, and/or the electro static capacitive panel.

The map data input device 14 inputs various data stored in the map data storage medium (not shown). The map data storage medium stores a map data such as a node data, a link data, a cost data, a road data, a geological data, a mark data, an intersection data, a stop sign position data, a data about facilities and the like. Further, the medium stores a voice data for an object, a voice recognition data and the like. The medium for storing the data is, for example, a CD-ROM, a DVD-ROM, a hard disk drive, a memory card and the like.

The display device 15 is a color display device such as a liquid crystal display, an organic EL display, a CRT and the like. The map image is displayed on the screen of the display device 15 based on the map data input from the map data input device 14. Further, a mark showing the current position of the vehicle detected by the detector 11, a guidance route from the current position to the destination, an additional data such as a name of a facility, a place, a street and the like, a landmark and a mark of facility are displayed on the screen of the device 15.

The sound output device 16 outputs voice message for various objects and voice guidance for a facility input from the map data input device 14.

The microphone 17 outputs an electric signal to the controller 19 based on the voice input from the user when the user inputs the voice. A voice command input from the user via the microphone 17 provides to control the navigation apparatus 10.

The in-vehicle LAN communication device 18 communicates with various ECUs 21-23, which are connected to the LAN 20.

The controller 19 is a microcomputer having a CPU, a ROM, a RAM, an I/O element, and a bus line for coupling among the CPU, the ROM, the RAM and the I/O element. Based on a program stored in the ROM, the controller 19 executes various processes such as map display process, a route guidance process, a schedule management process, a cell phone communication process and the like. Thus, the controller 19 has the map display function, the route guidance function, the schedule management function, the cell phone communication function and the like.

In the map display process, the controller 19 calculates the current position of the vehicle based on the detection signal from the position detector 11. The current position is shown as a combination of coordinates and a driving direction. The controller 19 controls the display device 15 to display the map around the current position of the vehicle, which is input from the map data input device 14.

In the route guidance process, the controller 19 selects a facility as the destination according to operation of the switches 12 and voice input via the microphone 17 based on a place data input from the map data input device 14. Then, the controller 19 executes a route calculation with using, for example, the Dijkstra method for automatically searching an optimum route from the current position to the destination. Then, the controller 19 guides the optimum route.

In the schedule management process, the controller 19 sets desired arrival time, at which the vehicle arrives at the facility as the destination, according to the operation of the switches 12 and the voice input via the microphone 17. Then, the controller 19 informs the driver of a fact that the current time approaches the desired arrival time.

In the cell phone communication process, the controller 19 provides to perform handsfree communication such that the driver can communicates with an external device via the cell phone PH without holding the phone PH in hand. Specifically, the driver communicates with the external device by inputting the voice with the microphone 17 and outputting the voice from the sound output device 16.

Thus, in the navigation apparatus 10, the controller 19 executes the voice recognition control process for controlling the apparatus 10 itself based on the recognition result of the voice recognition.

The ROM in the controller 19 stores a voice recognition dictionary 19*a* having reference voice patterns, which is used for recognizing the voice input from the microphone 17. The reference voice patterns shows a voice pattern corresponding to the words or phrase, which is expected to be produced by the driver when the driver requests to execute a certain function. The certain function is one of functions that the navigation apparatus 10 can execute. The reference voice pattern is prepared at each word or phrase.

Figure 2:
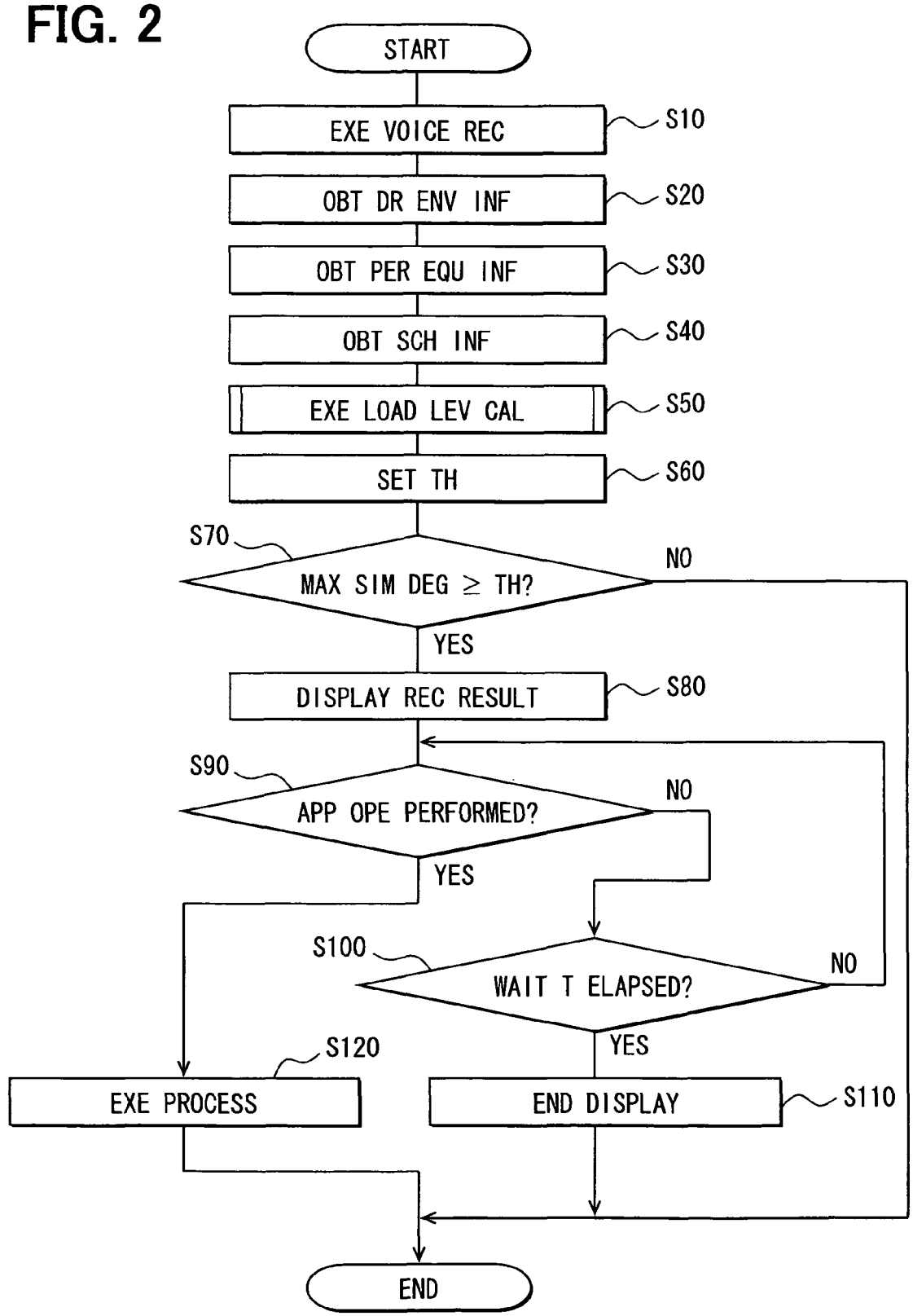
FIG. 2 is a flowchart showing a voice recognition control process according to the first embodiment.

Next, the voice recognition control process to be executed by the controller 19 in the navigation apparatus 10 will be explained with reference to FIG. 2. FIG. 2 is a flowchart of the voice recognition control process. The process is repeated when the controller 19 turns on (i.e., switches on or is activated).

When the controller 19 executes the voice recognition control process, the controller 19 executes voice recognition in step S10. Specifically, the controller 19 analyzes the voice input from the microphone 17, and then, the controller 19 verifies (i.e., checks) the voice with the reference voice pattern stored in the dictionary 19*a* so that the controller 19 calculates a degree of similarity (similarity degree) between the input voice and the reference voice pattern. The controller 19 specifies the word or the phrase corresponding to the reference voice pattern having the highest degree of similarity, and the controller determines that the word or the phrase is output from the user.

In step S20, the controller 19 obtains driving environmental information showing driving environment of the vehicle as driving conditions. In the present embodiment, the controller 19 obtains vehicle speed information as the driving environmental information from the indicator ECU 23.

In step S30, the controller 19 obtains peripheral equipment information showing whether peripheral equipment disposed around the apparatus 10 is operated. In the present embodiment, the controller 19 obtains switch operation information and driver communication information as the peripheral equipment information. The driver communication information shows whether the driver is calling via the cell phone PH at that moment. The switch operation information shows whether the switches 12 and/or the remote controller 13a are operated.

In step S40, the controller 19 obtains schedule information showing schedule of action of the driver. In the present embodiment, the controller 19 obtains desired arrival time information as the schedule information. The desired arrival time information shows the desired arrival time, which is set by the driver with using the schedule management function.

In step S50, the controller 19 executes load level calculation process for calculating a load level, which shows a magnitude of a load applied to the driver, on the basis of the information obtained in steps S20-S40. The load level is classified into four levels such as a first load level LV1, a second load level LV2, a third load level LV3 and a fourth load level LV4. The load level becomes larger in the order of the first to fourth load levels LV1-LV4 (i.e., LV1<LV2<LV3<LV4).

Figure 3:
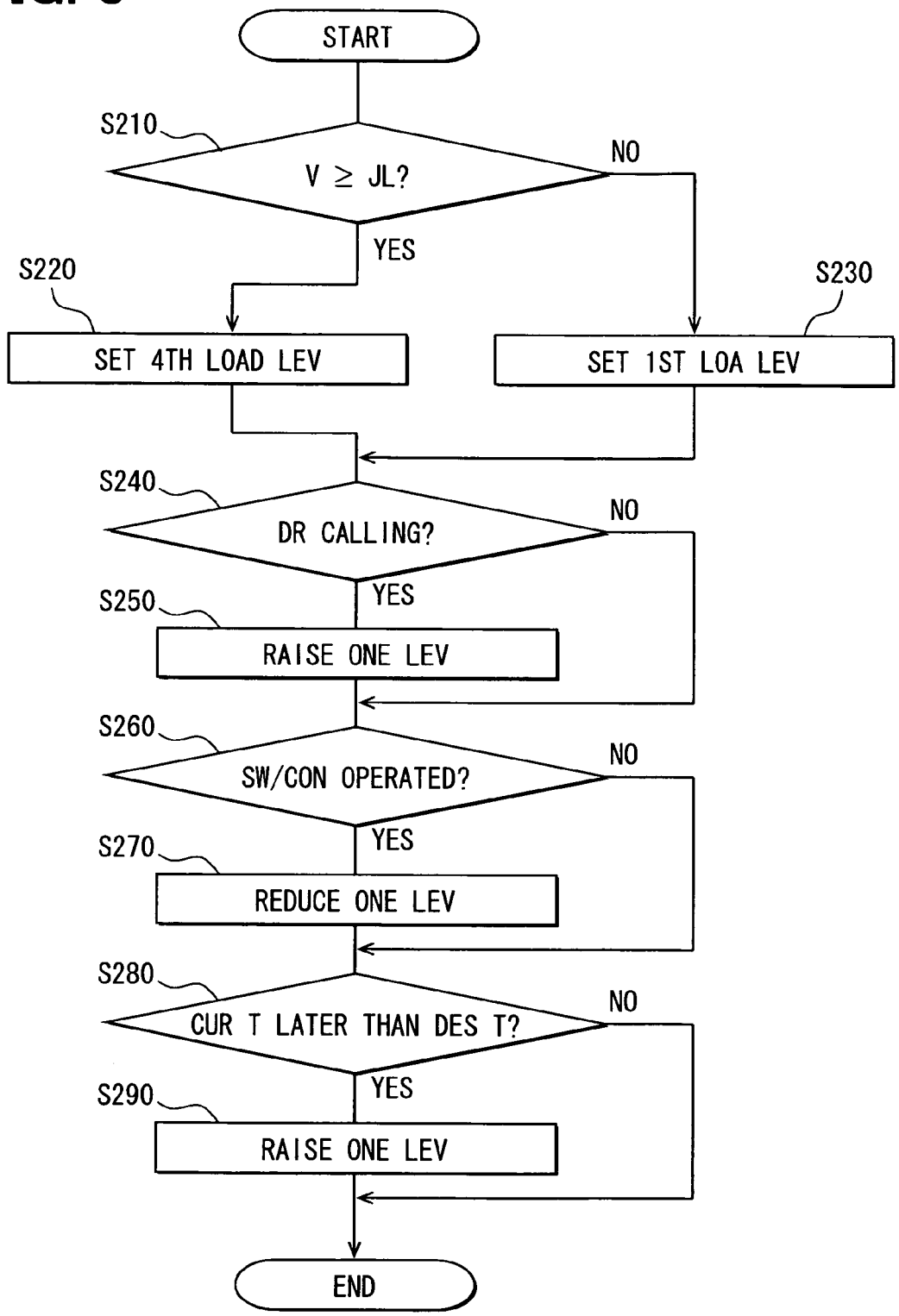
FIG. 3 is a flowchart showing a load level calculation process.

Here, the load level calculation process will be explained with reference to FIG. 3. FIG. 3 is a flowchart of the load level calculation process.

When the controller 19 executes the load level calculation process, in step S210, the controller 19 determines whether the vehicle speed V shown in the information obtained in step S20 is equal to or larger than a level determination value JL, which is preliminary set as a speed threshold. In this embodiment, the level determination value JL is 80 km/h. When the vehicle speed V is equal to or larger than the level determination value JL, i.e., when the determination in step S210 is "YES," it goes to step S220. In step S220, the load level is set to be the fourth load level LV4, and then, it goes to step S240. When the vehicle speed V is smaller than the level determination value JL, i.e., when the determination in step S210 is "NO," it goes to step S230. In step S230, the load level is set to be the first load level LV1, and then, it goes to step S240.

In step S240, the controller 19 determines based on the driver communication information obtained in step S30 whether the driver is calling. When the driver is calling, i.e., when the determination in step S240 is "YES," it goes to step S250. In step S250, the controller 19 raises the load level by one level. Then, it goes to step S260. Here, when the load level is the fourth load level LV4, the fourth load level LV4 is maintained. Accordingly, for example, when the load level is the fourth load level LV4, the controller sets the load level to be the fourth load level LV4 in step S250. When the load level is the first load level LV1, the controller sets the load level to be the second load level LV2 in step S250. When the driver is not calling, i.e., when the determination in step S240 is "NO," it goes to step S260.

In step S260, the controller 19 determines based on the switch operation information obtained in step S30 whether the switches 12 and/or the remote controller 13a are operated. When the switches 12 and/or the remote controller 13a are operated, i.e., when the determination in step S260 is "YES," it goes to step S270. In step S270, the controller 19 reduces the load level by one level. Then, it goes to step S280. Here, when the load level is the first load level LV1, the first load level LV1 is maintained. Accordingly, for example, when the load level is the first load level LV1, the controller sets the load level to be the first load level LV1 in step S270. When the load level is the fourth load level LV4, the controller 19 sets the load level to be the third load level LV3 in step S270. When the switches 12 and/or the remote controller 13a are not operated, i.e., when the determination in step S260 is "NO," it goes to step S280.

In step S280, the controller 19 determines based on the desired arrival time information obtained in step S40 whether the current time is later than the desired arrival time. When the current time is later than the desired arrival time, i.e., when the determination in step S280 is "YES," it goes to step S290. In step S290, the controller 19 raises the load level by one level. Then, the load level calculation process ends. Here, when the load level is the fourth load level LV4, the fourth load level LV4 is maintained. When the current time is prior to the desired arrival time, i.e., when the determination in step S280 is "NO," the load level calculation process ends without changing the load level.

Figure 4:
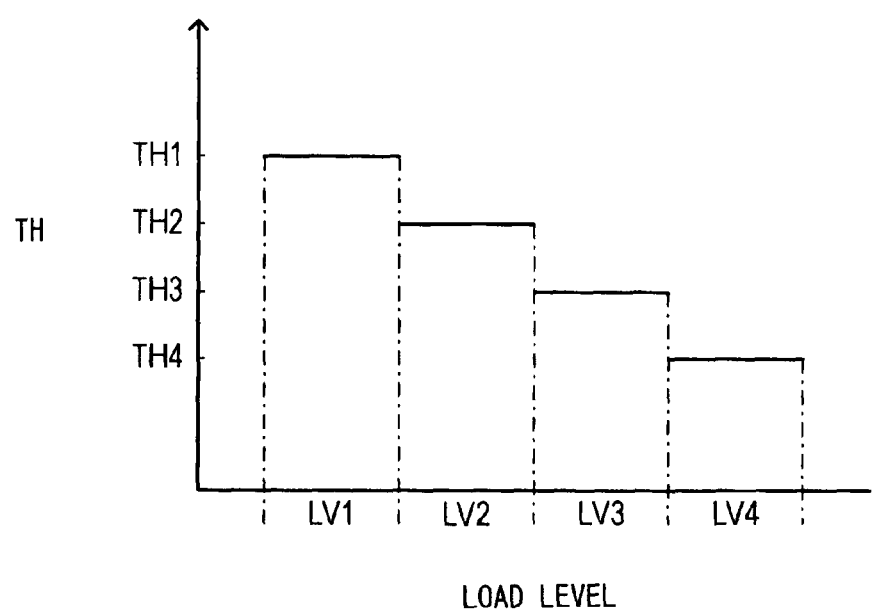
FIG. 4 is a graph showing a relationship between the load level and a display determination value.

When the load level calculation process ends, in step S60 in FIG. 2, the controller 19 sets a display determination value TH as a display threshold based on the load level calculated in step S50. The display determination value TH is a threshold for determining whether the controller controls the display device 15 to display the recognition result corresponding to the word or the phrase specified in step S10. Specifically, as shown in FIG. 4, when the load level calculated in step S50 is the first load level LV1, the controller 19 sets the display determination value TH to be a first display determination value TH1. When the load level is the second load level LV2, the controller 19 sets the display determination value TH to be a second display determination value TH2. When the load level is the third load level LV3, the controller 19 sets the display determination value TH to be a third display determination value TH3. When the load level is the fourth load level LV4, the controller 19 sets the display determination value TH to be a fourth display determination value TH4. Here, the display determination value TH becomes smaller in the order of the first to fourth display determination values TH1-TH4 (i.e., TH1>TH2>TH3>TH4).

In step S70, the controller 19 determines whether the maximum similarity degree calculated in step S10 is equal to or larger than the display determination value TH set in step S60. When the maximum similarity degree is smaller than the display determination value TH, i.e., when the determination in step S70 is "NO," the voice recognition control process ends.

Figure 5:
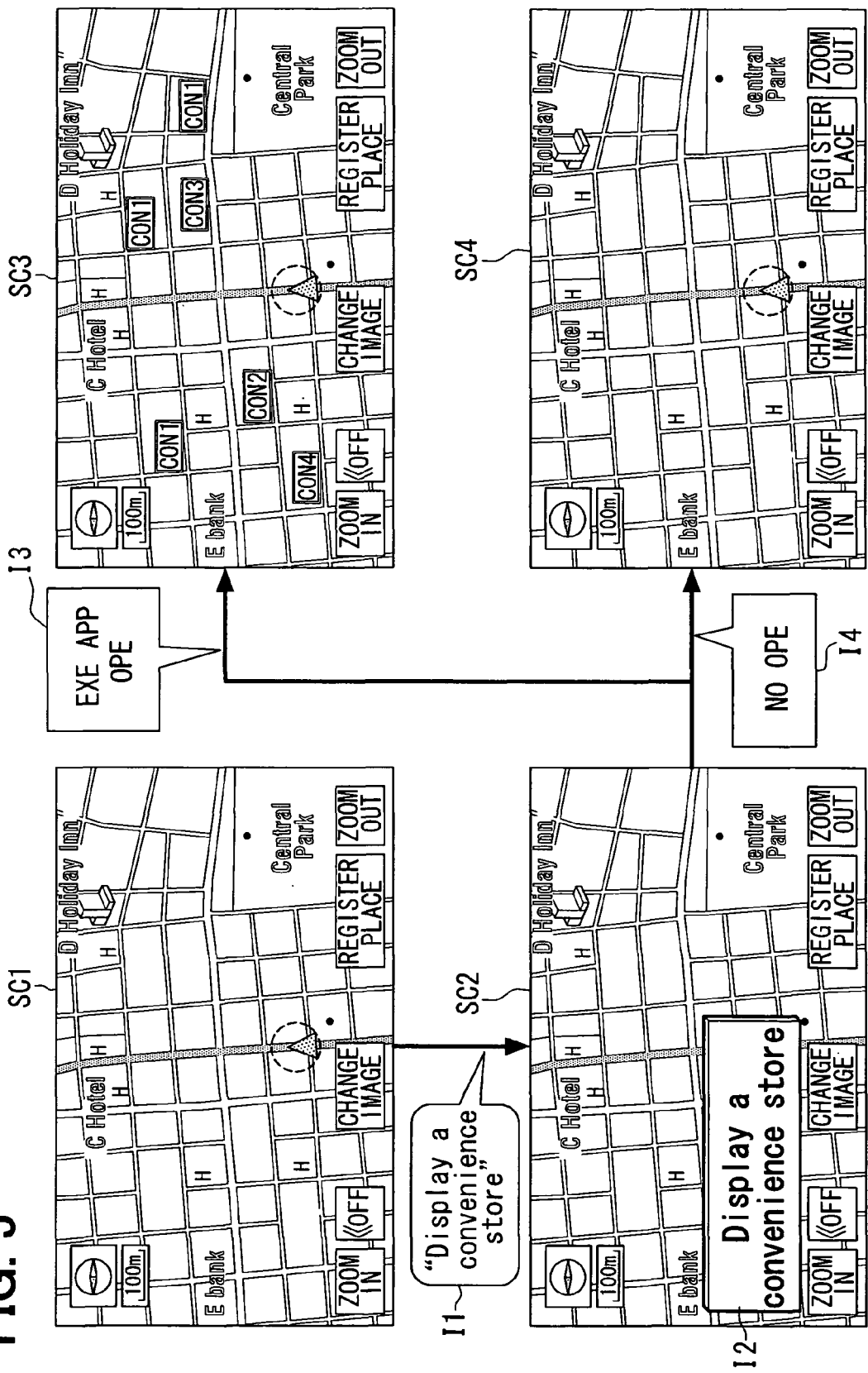
FIG. 5 is a diagram showing a screen of a display.

When the maximum similarity degree is equal to or larger than the display determination value TH, i.e., when the determination in step S70 is "YES," it goes to step S80. In step S80, the controller 19 controls the display device 15 to display the recognition result corresponding to the word or the phrase specified in step S10. For example, under a condition that the display 15 displays the map around the current position of the vehicle, when the user says the phrase, for example, "Display a convenience store," the display device 15 displays the letters of "Display a convenience store." Here, the state that the display 15 displays the map around the vehicle is shown as an image SC1 in FIG. 5. When the user says the phrase "Display a convenience store," this is an instruction I1 to the apparatus 10 in FIG. 5. The state that the display device 15 displays the letters of "Display a convenience store" is shown as an image SC2, and the letters of "Display a, convenience store" is an instruction I2 for the controller 19.

Then, in step S90, the controller 19 determines whether operation for agreement to execute a process corresponding to the recognition result, i.e., the instruction displayed in step S80 is performed via the switches 12. Here, the operation for agreement is defined as execution approval operation. When the execution approval operation is not performed, i.e., when the determination in step S90 is "NO," it goes to step S100. In step S100, the controller 19 determines whether a predetermined operation waiting time has elapsed since the step S80 is performed. In this embodiment, the operation waiting time is set to be five seconds. When the operation waiting time has not elapsed, i.e., when the determination in step S100 is "NO," it goes to step S90. Then, step S90 is repeated. When the operation waiting time has elapsed, i.e., when the determination in step S100 is "YES," it goes to step S110. In step S110, the controller 19 controls the display device 15 to stop displaying the recognition result, which is displayed in step S80. The controller 19 ends the voice recognition control process temporally.

In step S90, when the execution approval operation is performed, i.e., when the determination in step S90 is "YES," it goes to step S120. In step S120, the controller 19 executes the process based on the voice recognition result obtained in step S10, the process which corresponds to the recognition result displayed in step S80. Then, the controller 19 temporally ends the voice recognition control process.

For example, under a condition that the display 15 displays the letters, i.e., the phrase "Display a convenience store," when the execution approval operation is performed after the display of the phrase and before the operation waiting time elapses, the display 15 displays a position of a convenience store around the vehicle. Here, in FIG. 5, the mark CON1 to CON4 represent different convenience stores. When the execution approval operation is not performed before the operation waiting time elapses, the display 15 stops displaying the phrase "Display a convenience store," i.e., the display 15 deletes the phrase. Here, the state that the display 15 displays the phrase "Display a convenience store" is shown as an image SC2 in FIG. 5. When the execution approval operation is performed, this operation is an instruction 13 in FIG. 5. A state that the display 15 displays the position of the convenience store around the vehicle is shown as an image SC3. When the execution approval operation is not performed, this state is an instruction 14 in FIG. 5. A state that display 15 deletes the phrase "Display a convenience store" is shown as an image SC4.

Thus, in the navigation apparatus 10, the voice expressed by the driver is input into the apparatus 10 via the microphone 17. The dictionary 19a stores multiple reference voice patterns corresponding to the phrases or words, which are preliminary set. The controller 19 calculates the similarity degree between the voice input via the microphone 17 and the reference patterns stored in the dictionary 19a. In step S10, the controller 19 recognizes the words or the phrase corresponding to the reference voice pattern having the highest similarity degree as the words or the phrase, which is expressed by the user. In step S80, the display 15 displays the recognition result corresponding to the words or the phrase recognized in step S10. Further, when the user performs the execution approval operation in step S90 after the display 15 displays the recognition result, in step S120, the controller 19 executes the process corresponding to the recognition result recognized in step S10.

Further, the driving environmental information (e.g., the vehicle speed information), the peripheral equipment information (e.g., the driver communication information and the switch operation information), and the schedule information (e.g., the desired arrival time information) are obtained in steps S20-S40. Based on the driving environmental information, the peripheral equipment information and the schedule information, the load level showing the magnitude of the load applied to the driver is calculated in steps S50, S210-S290.

Specifically, when the driver is calling with using the cell phone PH, the load level is calculated in steps S240, S250 such that the load level in case of calling is larger than the load level in case of not calling. Further, when the switches 12 and/or the remote controller 13a are operated, the load level is calculated in steps S260, S270 such that the load level in case of operation is larger than the load level in case of no operation.

Based on correlative relationship, which is preliminary set so as to define a negative correlation with respect to the load level calculated in step S50, the controller 19 sets the display determination value TH in step S60. When the similarity degree corresponding to the words or the phrase recognized in step S10 is smaller than the display determination value TH, the controller 19 prohibits the display device 15 from displaying the recognition result in step S70. Thus, the controller 19 controls the display device 15 so as to have a positive correlation between the load level and the repetition of the display of the recognition result in the display device 15.

In the navigation apparatus 10, when the load applied to the driver becomes large, the display repetition of the recognition result increases. Thus, when the load of the driver is large, i.e., when the repetition that the driver looks at and recognizes the display image of the display device 15 is small, the recognition result is frequently displayed. When the load of the driver is small, i.e., when the repetition that the driver looks at and recognizes the display image of the display device 15 is large, the recognition result is not frequently displayed.

Specifically, when the load of the driver is large, it is difficult for the driver to look at the display image of the recognition result. Thus, even when the display repetition of the recognition result corresponding to the phrase or the words that are not necessary to be recognized becomes large, the display image does not bother the driver. Further, since the display repetition of the recognition result becomes large, a repetition that the controller 19 does not recognize the words or the phrase expressed by the user, and does not control the display device 15 to display the recognition result is small. Accordingly, it is not necessary for the driver to express (i.e., say) the phrase or the words repeatedly so as to make the apparatus 10 recognize the phrase or the words, which is expressed by the driver. Thus, the apparatus 10 does not bother the driver. Specifically, unwanted situation for the driver is prevented from being occurred.

When the load of the driver is small, it is easy for the driver to look at the display image of the recognition result. Thus, when the display repetition of the recognition result corresponding to the phrase or the words that are not necessary to be recognized becomes small, the display image does not bother the driver. Since the display repetition of the recognition result becomes small, a repetition that the controller 19 does not recognize the words or the phrase that are necessary to be recognized and are expressed by the examiner, and does not control the display device 15 to display the recognition result is large. However, even when the driver expresses (i.e., says) the phrase or the words repeatedly so as to make the apparatus 10 recognize the phrase or the words, which is expressed by the driver, sense of resistance of the driver is comparatively small since the load of the driver is small.

Thus, without reducing the usability of the navigation apparatus 10 for the driver, the unpleasant sense of the driver is reduced. The unpleasant sense is derived from the display of the recognition result corresponding to the words or the phrase, which is not necessary for the apparatus to be recognized.

The navigation apparatus is used for a voice recognition apparatus. The microphone 17 functions as a voice input element and a voice input function. The voice recognition dictionary 19a functions as a voice pattern storing element. Step S10 corresponds to a voice recognition element and a voice recognition function. Step S80 corresponds to a display device and a display function. Step S90 corresponds to an execution determination element and an execution determination function. Step S50 functions as a load estimation element and a load estimation function. Steps S60 and S70 correspond to a display controller and a display control function. Step S60 corresponds to a determination value setting element and a determination value setting function. Step S70 corresponds to a display prohibition element and a display prohibition function. Step S40 corresponds to a desired arrival time information obtaining element and a desired arrival time information obtaining function.

The reference voice pattern is a standard voice pattern. The similarity degree is a pattern similarity degree. The execution approval operation is an external operation. The load level is a user load amount. The desired arrival time information is an estimated arrival time.

Second Embodiment

Figure 6:
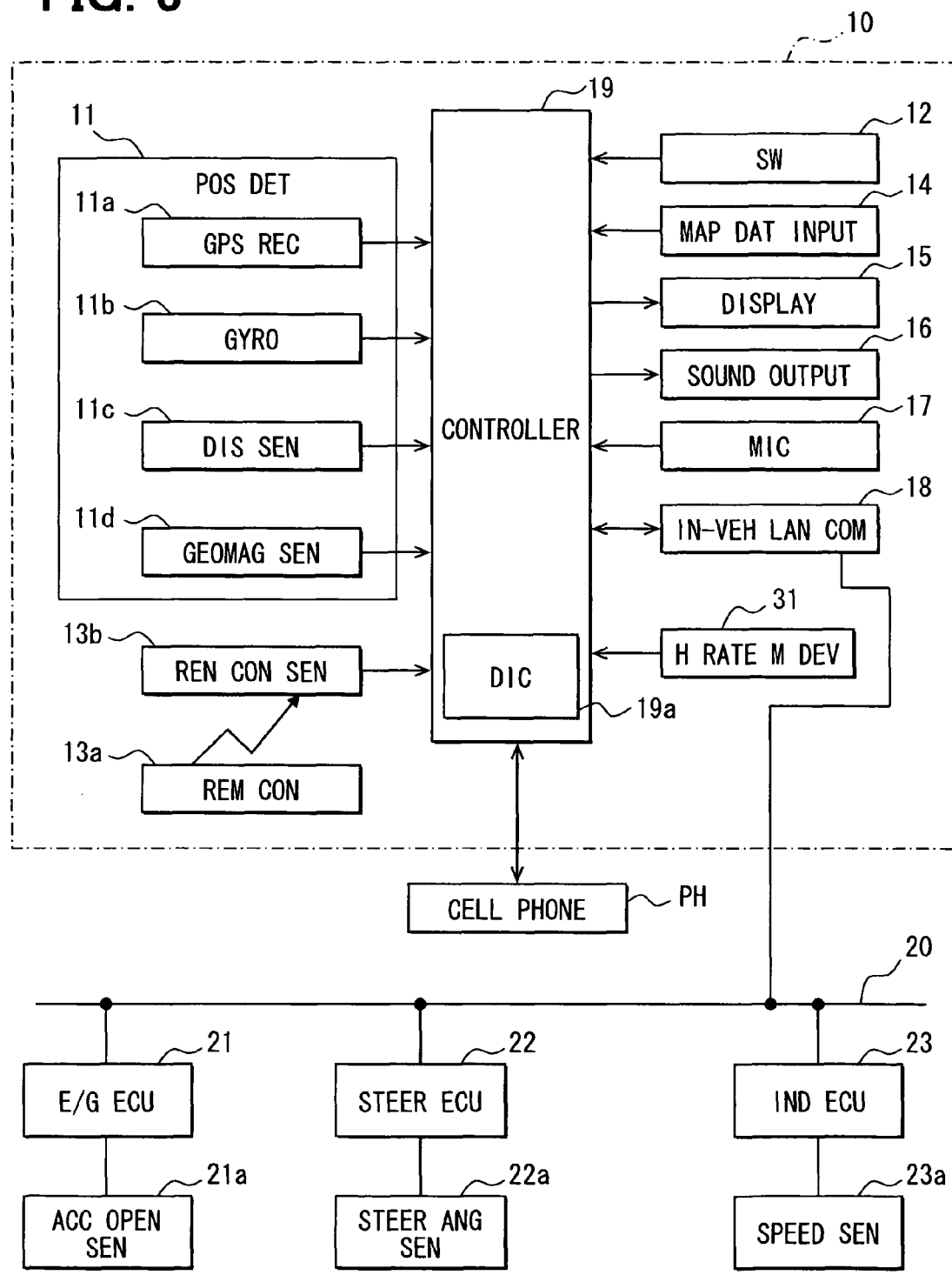
FIG. 6 is a block diagram showing a navigation apparatus according to a second embodiment.

A navigation apparatus 10 and an in-vehicle LAN 20 according to a second embodiment are shown in FIG. 6. The LAN 20 is coupled with the apparatus 10.

The apparatus 10 further includes a heart rate measurement device 31 for measuring a heart rate of a driver.

The heart rate measurement device 31 includes, for example, a pair of electrodes, which is disposed on a ring portion of a steering wheel. When the driver holds the electrodes with his right and left hands, a potential difference between the electrodes is detected. Thus, a cardiographic waveform of the driver is measured. Based on the cardiographic waveform, the heart rate of the driver is detected. The heart rate measurement device 31 transmits the information about the heart rate showing the detected heart rate to the controller 19 of the apparatus 10.

Figure 7:
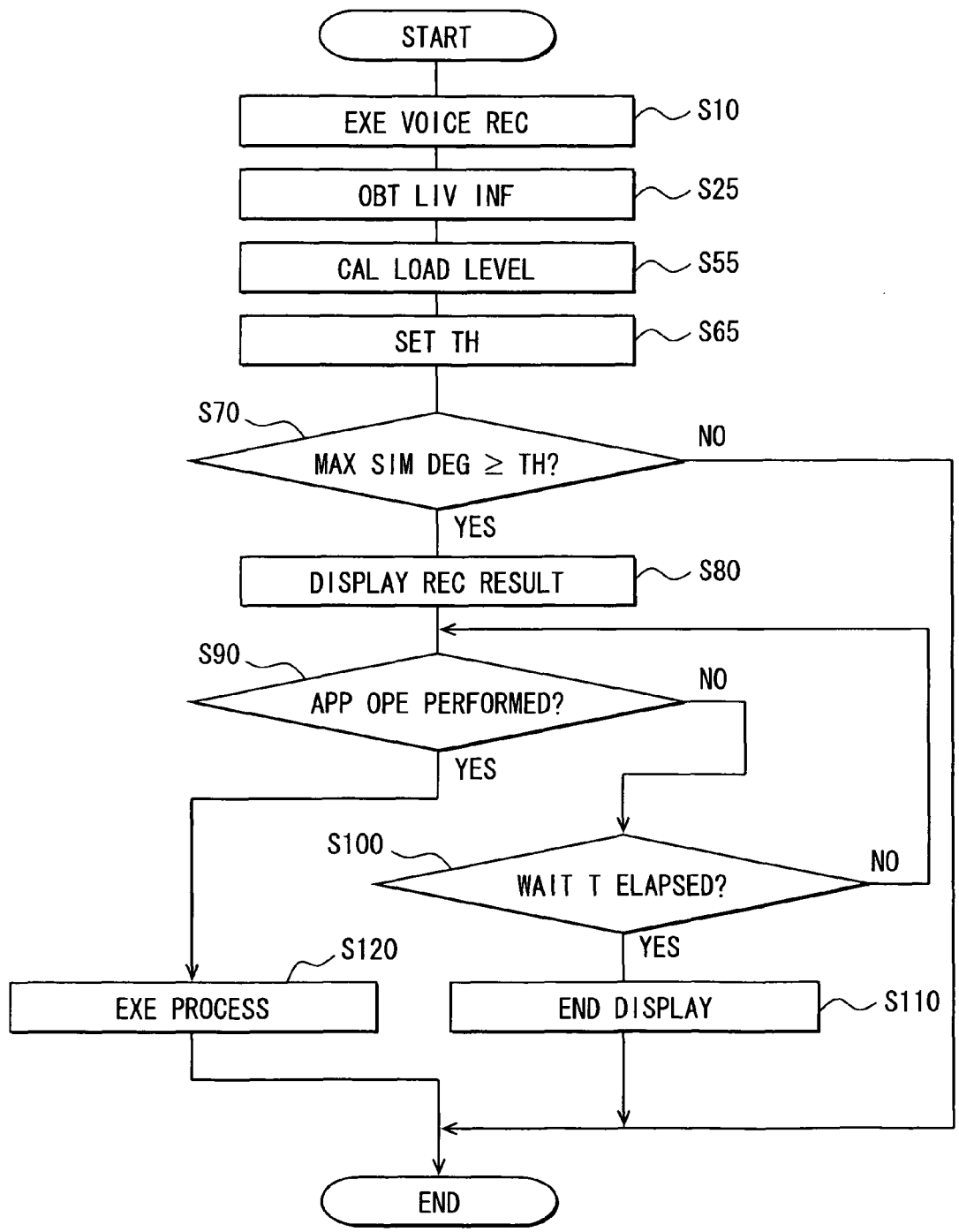
FIG. 7 is a flowchart showing a voice recognition control process according to the second embodiment.

Next, a voice recognition control process according to the second embodiment will be explained with FIG. 7. FIG. 7 is a flowchart of the voice recognition control process.

The process in FIG. 7 includes steps S25, S55 and S65 instead of steps S20-S60 in FIG. 2.

After step S10 ends, in step S25, the living body information of the driver is obtained. Specifically, in the present embodiment, the information about the heart rate is obtained from the heart rate measurement device 31.

Figure 8A:
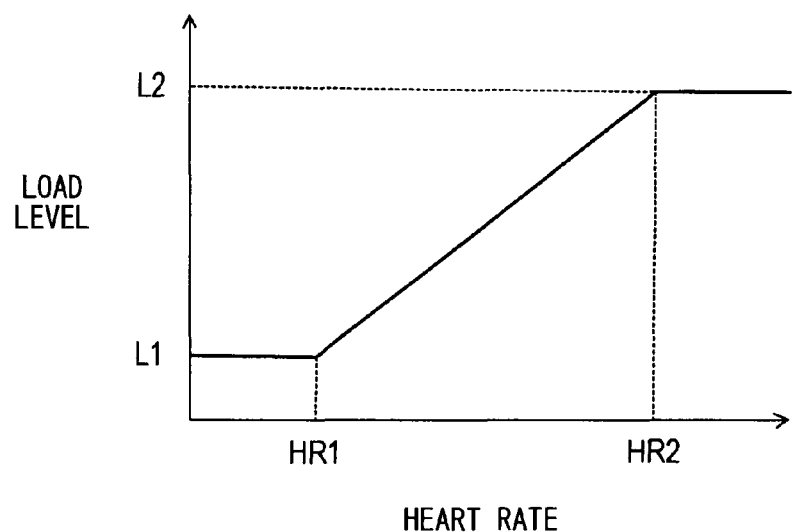
FIG. 8A is a graph showing a relationship between the load level and the number of heart beat.

In step S55, based on the information about the heart rate obtained in step S25, the load level showing a load magnitude to be applied to the driver is calculated. For example, the load level is calculated based on a level calculation table showing a relationship between the heart rate and the load level. In the present embodiment, as shown in FIG. 8A, when the heart rate is smaller than a predetermined low heart rate HR1, the load level is set to be L1. When the heart rate is larger than a predetermined high heart rate HR2, the load level is set to be L2. When the heart rate is in a range between the low heart rate HR1 and the high heart rate HR2, the load level is calculated according to the formula F1. Here, in the formula F1, the load level is shown as "Y," and the heart rate is shown as "X."

$$Y=\{(L2-L1)\times(X-HR1)/(HR2-HR1)\}+L1 \qquad F1$$

Thus, when the heart rate becomes large, the load level increases.

Figure 8B:
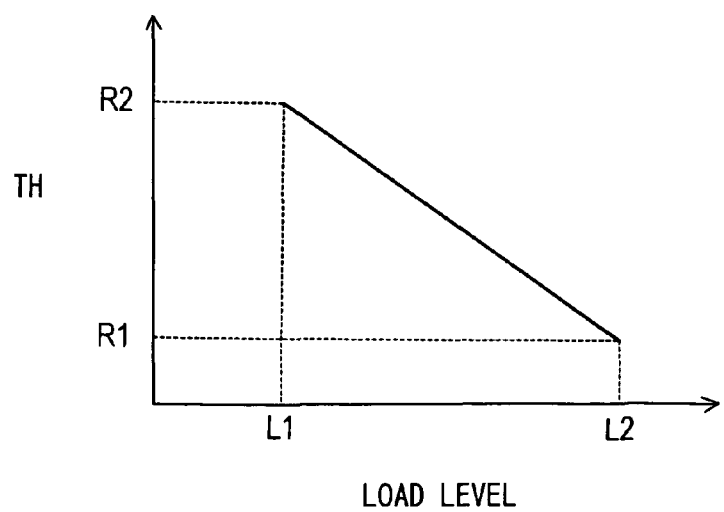
FIG. 8B is a graph showing a relationship between the load level and the display determination value.
Figure 9:
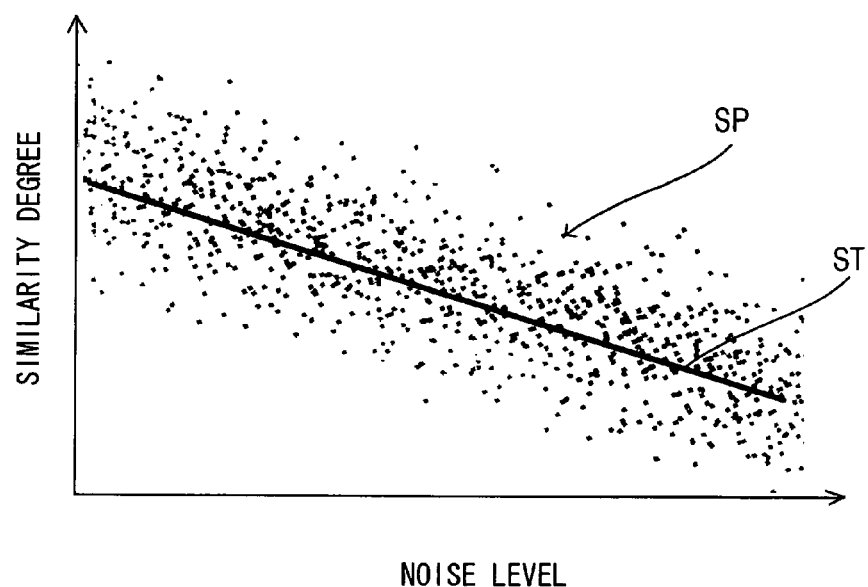
FIG. 9 is a graph showing a relationship between a noise level and a similarity degree according to the prior art.

Then, in step S65, the display determination value TH is set according to the load level calculated in step S55. For example, based on a determination value calculation table showing a relationship between the load level and the display determination value TH, the display determination value TH is calculated. In the present embodiment, as shown in FIG. 8B, the display determination value TH is calculated according to the formula F2. Here, in the formula F2, the display determination value TH is shown as "Y," and the load level is shown as "X."

$$Y=\{(R1-R2)\times(X-L1)/(L2-L1)\}+R1 \qquad F1$$

Thus, when the load level becomes large, the display determination value TH decreases.

After step S65, it goes to step S70.

The apparatus 10 calculates the degree of similarity between the voice input through the microphone 17 and multiple reference voice patterns stored in the dictionary 19a. Then, the apparatus 10 determines the voice corresponding to the highest similarity degree of the reference voice pattern and recognizes the voice, which is output from the driver, in step S10. Further, in step S80, the apparatus 10 controls the display device 15 to display the recognition result of the words corresponding to the voice recognized in step S10. Furthermore, when the driver executes the execution approval operation in step S90 after the display device 15 displays the recognition result, the apparatus 10 executes a process corresponding to the recognition result in step S120.

In step S25, the apparatus 10 obtains the living body information such as the heart rate information. Based on the obtained living body information, the apparatus 10 calculates the load level showing the magnitude of the load applied to the driver in step S55.

Based on the correlative relationship, which is preliminary set such that the display determination value TH and the load level calculated in step S55 have the negative correlation, the display determination value TH is set in step S65. When the highest similarity degree corresponding to the voice recognized in step S10 is smaller than the display determination value TH, the apparatus 10 prohibits the display of the recognition result on the display device 15 in step S70. Thus, the apparatus 10 controls the display device 15 to have the positive correlation between the load level and the repetition of the display of the recognition result in the display device 15.

Thus, without reducing the usability of the navigation apparatus 10 for the driver, the unpleasant sense of the driver is reduced. The unpleasant sense is derived from the display of the recognition result corresponding to the words or the phrase, which is not necessary for the apparatus to be recognized.

Step S55 functions as a load estimation element and a load, estimation function. Steps S65 and S70 correspond to a display controller and a display control function. Step S65 corresponds to a determination value setting element and a determination value setting function. Step S25 corresponds to a living body information obtaining element and a living body information obtaining function.

In the above embodiments, the vehicle speed information as the driving environmental information is obtained, and the load level is calculated. Alternatively, the driving environmental information may be acceleration information, throttle valve opening degree information, steering wheel angle information, information about switching on and off of a wiper, information about traffic volume around the vehicle, information about gradient of a driving road, information about curvature of the driving road, information about a pedestrian around the vehicle, information about brightness around the vehicle, information about whether around the vehicle and the like. Based on the driving environmental information, the load level may be calculated.

In the above embodiments, the heart rate information as the living body information is obtained, and then, the load level is calculated. Alternatively, sleepiness degree information or arousal degree information as the living body information may be obtained, and then, the load level is calculated based on the living body information.

In the above embodiments, the load level is calculated based on determination whether the current time is prior to or after the desired arrival time. Alternatively, the load level may be calculated based on both of the time interval from the current time to the desired arrival time and the distance from the current position to the destination. For example, when the time interval to the desired arrival time is equal to or smaller than a predetermined time interval, and the distance to the destination is equal to or larger than a predetermined distance, the load level is set to be high.

In the above embodiments, the relationship between the heart rate and the load level and the relationship between the load level and the display determination value TH are described as a piecewise linear function. Alternatively, the relationship between the heart rate and the load level and the relationship between the load level and the display determination value TH may be a logistic function.

The above disclosure has the following aspects.

According to a first aspect of the present disclosure, a voice recognition apparatus includes: a voice input element for inputting voice of an user; a voice pattern memory for storing a plurality of voice patterns respectively corresponding to a plurality of phrases, which are preliminary set; a voice recognition element for calculating a similarity degree between the voice and each of the voice patterns and determining the highest similarity degree so that one of the voice patterns corresponding to the highest similarity degree is recognized as the voice of the user; a display for displaying a recognition result corresponding to the one of the voice patterns; an execution determination element for executing a process according to the one of the voice patterns when a predetermined operation is input by the user after the display displays the recognition result; a load estimation element for estimating a load of the user; and a display controller for controlling the display based on a positive correlation between the estimated load and display repetition of the recognition result on the display.

Here, the phrase "a positive correlation between the estimated load and display repetition of the recognition result on the display" means not only a case where the display repetition continuously increases as the load becomes large but also a case where the display repetition increases in a stepwise manner as the load becomes large.

In the above apparatus, when the load applied to the user becomes large, the display repetition of the recognition result displayed on the display increases. Thus, when the load of the user is large, i.e., when the repetition that the user looks at and recognizes the display is small, the recognition result is frequently displayed. When the load of the user is small, i.e., when the repetition that the user looks at and recognizes the display is large, the recognition result is not frequently displayed.

Specifically, when the load of the user is large, it is difficult for the user to look at the display of the recognition result. Thus, even when the display repetition of the recognition result corresponding to the phrase that is not necessary to be recognized becomes large, the display image does not bother the user. Further, since the display repetition of the recognition result becomes large, a repetition that the apparatus does not recognize the phrase expressed by the user, and does not control the display to display the recognition result is small. Accordingly, it is not necessary for the user to express the phrase repeatedly so as to make the apparatus recognize the phrase, which is expressed by the user. Thus, the apparatus does not bother the user. Specifically, unwanted situation for the user is prevented from being occurred.

When the load of the user is small, it is easy for the user to look at the display image of the recognition result. Thus, when the display repetition of the recognition result corresponding to the phrase that is not necessary to be recognized becomes small, the display image does not bother the user. Since the display repetition of the recognition result becomes small, a repetition that the apparatus does not recognize the phrase that are necessary to be recognized and are expressed by the user, and does not control the display to display the recognition result is large. However, even when the user expresses the phrase repeatedly so as to make the apparatus recognize the phrase, which are expressed by the user, sense of resistance of the user is comparatively small since the load of the user is small.

Thus, in the above apparatus, without reducing the usability of the apparatus for the user, the unpleasant sense of the user is reduced. The unpleasant of the user is derived from the display of the recognition result corresponding to the phrase, which is not necessary for the apparatus to be recognized.

Alternatively, the display controller may include: a determination value setting element for setting a display determination value having a negative correlation to the estimated load; and a display prohibition element for prohibiting the display from displaying the recognition result when the highest similarity degree is smaller than the display determination value.

Alternatively, the load estimation element may estimate the load of the user based on usage of devices, which are available for the user. A degree for the user to look at the display of the recognition result may be different when the user operates devices. Thus, the load is estimated based on the usage of the devices.

Alternatively, the load estimation element may estimate the load in such a manner that the load in a case where the user is calling with a communication device is larger than the load in a case where the user is not calling with the communication device. When the user is calling with a communication device, the user pays attention to the conversation. Accordingly, it is difficult for the user to look at the display of the recognition result, compared with a case where the user is not calling with the communication device.

Alternatively, the load estimation element may estimate the load in such a manner that the load in a case where the user uses a periphery device around a screen of the display is smaller than the load in a case where the user does not use the periphery device. When the user uses a periphery device around a screen of the display, the user pays attention to the screen of the display. Thus, it is easy for the user to look at the display of the recognition result, compared with a case where the user does not use the periphery device.

Alternatively, the load estimation element may include a schedule time information obtaining element for obtaining schedule time information, which shows a schedule time of the user, and the load estimation element estimates the load based on the schedule time information. When the user is a driver of a vehicle, and the driver is driving the vehicle toward a destination, at which the driver will meets another person at the schedule time, impatience of the driver is different if the driver has enough time to arrive at the destination or if the driver cannot arrive at the destination by the schedule time. Thus, it is difficult for the user to look at the display of the recognition result when the driver has enough time to arrive at the destination, compared with a case where the driver cannot arrive at the destination by the schedule time. For example, the apparatus determines based on the time interval between the desired arrival time and the current time, the distance between the current position of the vehicle and the destination, and a vehicle speed whether the user can arrive at the destination by the schedule time. When the apparatus determines that the driver cannot arrive at the destination by the desired arrival time, the load is estimated to be large.

Alternatively, the load estimation element may include a living body information obtaining element for obtaining living body information of the user, and the load estimation element estimates the load based on the living body information. Further, the living body information obtaining element may be a heart rate measurement device, and the living body information is a heart rate of the user. When the load applied to the user is large, the heart rate of the user is large, compared with a case where the load is small. Accordingly, the degree for the user to look at the display of the recognition result may correspond to the heart rate. Alternatively, the degree for the user to look at the display of the recognition result may correspond to sleepiness of the user. Specifically, when the sleepiness of the user is large, the degree for the user to look at the display of the recognition result is small. Thus, the load is estimated based on the living body information.

Alternatively, the apparatus may further include: a speed sensor for detecting a speed of a vehicle. The load is defined by first to fourth load level, which are arranged in ascending order. The load estimation element estimates the load in such a manner that the load is estimated as a fourth load level when the speed is equal to or higher than a predetermined speed, and the load is estimated as a first load level when the speed is lower than the predetermined speed. The load estimation element raises the load level by one level when the user is calling with a communication device. The load estimation element reduces the load level by one level when the user uses a periphery device around a screen of the display. The load estimation element raises the load level by one level when a desired arrival time of the vehicle has elapsed. The load level is not changed when the load estimation element raises the load level by one level from the fourth load level, and the load level is not changed when the load estimation element reduces the load level by one level from the first load level.

Further, the display controller may include: a determination value setting element for setting a display determination value; and a display prohibition element for prohibiting the display from displaying the recognition result when the highest similarity degree is smaller than the display determination value. The display determination value is defined by first to fourth display determination values, which are arranged in descending order. The determination value setting element sets the first to fourth display determination values when the load is the first to fourth load levels, respectively.

According to a second aspect of the present disclosure, a method for recognizing a voice includes: inputting the voice of an user; calculating a similarity degree between the voice and each of a plurality of voice patterns, wherein the plurality of voice patterns respectively correspond to a plurality of phrases, which are preliminary set; determining the highest similarity degree so that one of the voice patterns corresponding to the highest similarity degree is recognized as the voice of the user; displaying a recognition result corresponding to the one of the voice patterns; executing a process according to the one of the voice patterns when a predetermined operation is input by the user after the displaying the recognition result; estimating a load of the user; and controlling to display the recognition result based on a positive correlation, between the estimated load and display repetition of the recognition result.

In the above method, without reducing the usability for the user, the unpleasant sense of the user is reduced. The unpleasant of the user is derived from the display of the recognition result corresponding to the phrase, which is not necessary for the apparatus to be recognized.

According to a third aspect of the present disclosure, a navigation apparatus includes: the voice recognition apparatus according to the first aspect of the present disclosure.

In the above navigation apparatus, without reducing the usability for the user, the unpleasant sense of the user is reduced. The unpleasant of the user is derived from the display of the recognition result corresponding to the phrase, which is not necessary for the apparatus to be recognized.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A voice recognition apparatus comprising:
   a voice input element for inputting voice of an user;
   a voice pattern memory for storing a plurality of voice patterns respectively corresponding to a plurality of phrases, which are preliminary set;
   a voice recognition element for calculating a similarity degree between the voice and each of the voice patterns and determining the highest similarity degree so that one of the voice patterns corresponding to the highest similarity degree is recognized as the voice of the user;
   a display for displaying a recognition result corresponding to the one of the voice patterns;
   an execution determination element for executing a process according to the one of the voice patterns when a predetermined operation is input by the user after the display displays the recognition result;
   a load estimation element for estimating a load of the user; and
   a display controller for controlling the display based on a positive correlation between the estimated load and display repetition of the recognition result on the display.

2. The apparatus according to claim 1,
   wherein the display controller includes:
      a determination value setting element for setting a display determination value having a negative correlation to the estimated load; and
      a display prohibition element for prohibiting the display from displaying the recognition result when the highest similarity degree is smaller than the display determination value.

3. The apparatus according to claim 1,
   wherein the load estimation element estimates the load of the user based on usage of devices, which are available for the user.

4. The apparatus according to claim 3,
   wherein the load estimation element estimates the load in such a manner that the load in a case where the user is calling with a communication device is larger than the load in a case where the user is not calling with the communication device.

5. The apparatus according to claim 3,
wherein the load estimation element estimates the load in such a manner that the load in a case where the user uses a periphery device around a screen of the display is smaller than the load in a case where the user does not use the periphery device.

6. The apparatus according to claim 1,
wherein the load estimation element includes a schedule time information obtaining element for obtaining schedule time information, which shows a schedule time of the user, and
wherein the load estimation element estimates the load based on the schedule time information.

7. The apparatus according to claim 1,
wherein the load estimation element includes a living body information obtaining element for obtaining living body information of the user, and
wherein the load estimation element estimates the load based on the living body information.

8. The apparatus according to claim 7,
wherein the living body information obtaining element is a heart rate measurement device, and
wherein the living body information is a heart rate of the user.

9. The apparatus according to claim 1, further comprising:
a speed sensor for detecting a speed of a vehicle,
wherein the load is defined by first to fourth load level, which are arranged in ascending order,
wherein the load estimation element estimates the load in such a manner that the load is estimated as a fourth load level when the speed is equal to or higher than a predetermined speed, and the load is estimated as a first load level when the speed is lower than the predetermined speed,
wherein the load estimation element raises the load level by one level when the user is calling with a communication device,
wherein the load estimation element reduces the load level by one level when the user uses a periphery device around a screen of the display,
wherein the load estimation element raises the load level by one level when a desired arrival time of the vehicle has elapsed,
wherein the load level is not changed when the load estimation element raises the load level by one level from the fourth load level, and
wherein the load level is not changed when the load estimation element reduces the load level by one level from the first load level.

10. The apparatus according to claim 9,
wherein the display controller includes:
a determination value setting element for setting a display determination value; and
a display prohibition element for prohibiting the display from displaying the recognition result when the highest similarity degree is smaller than the display determination value,
wherein the display determination value is defined by first to fourth display determination values, which are arranged in descending order,
wherein the determination value setting element sets the first to fourth display determination values when the load is the first to fourth load levels, respectively.

11. A navigation apparatus comprising:
the voice recognition apparatus according to claim 1.

12. A method for recognizing a voice comprising:
inputting the voice of an user;
calculating a similarity degree between the voice and each of a plurality of voice patterns, wherein the plurality of voice patterns respectively correspond to a plurality of phrases, which are preliminary set;
determining the highest similarity degree so that one of the voice patterns corresponding to the highest similarity degree is recognized as the voice of the user;
displaying a recognition result corresponding to the one of the voice patterns;
executing a process according to the one of the voice patterns when a predetermined operation is input by the user after the displaying the recognition result;
estimating a load of the user; and
controlling to display the recognition result based on a positive correlation between the estimated load and display repetition of the recognition result.

13. The method according to claim 12,
wherein the controlling to display includes:
setting a display determination value having a negative correlation to the estimated load; and
prohibiting from displaying the recognition result when the highest similarity degree is smaller than the display determination value.

14. The method according to claim 12,
wherein the load of the user is estimated based on usage of devices, which are available for the user.

15. The method according to claim 14,
wherein the load of the user is estimated such a manner that the load in a case where the user is calling with a communication device is larger than the load in a case where the user is not calling with the communication device.

16. The method according to claim 14,
wherein the load of the user is estimated in such a manner that the load in a case where the user uses a periphery device around a screen of a display is smaller than the load in a case where the user does not use the periphery device.

17. The method according to claim 12,
wherein the estimating the load of the user includes obtaining schedule time information, which shows a schedule time of the user, and
wherein the load of the user is estimated based on the schedule time information.

18. The method according to claim 12,
wherein the estimating the load of the user includes obtaining living body information of the user, and
wherein the load of the user is estimated based on the living body information.

* * * * *